United States Patent
Shah et al.

(10) Patent No.: US 11,403,311 B2
(45) Date of Patent: *Aug. 2, 2022

(54) SYSTEMS AND METHODS FOR QUERYING TIME SERIES DATA

(71) Applicant: ServiceNow, Inc., Santa Clara, CA (US)

(72) Inventors: Siddharth Shah, Bellevue, WA (US); Vincent Seguin, Encinitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/076,092

(22) Filed: Oct. 21, 2020

(65) Prior Publication Data

US 2021/0034620 A1 Feb. 4, 2021

Related U.S. Application Data

(63) Continuation of application No. 15/483,885, filed on Apr. 10, 2017, now Pat. No. 10,817,524.

(51) Int. Cl.
*G06F 16/2458* (2019.01)
(52) U.S. Cl.
CPC .............................. *G06F 16/2477* (2019.01)
(58) Field of Classification Search
CPC .................................................. G06F 16/2477
USPC ....................................................... 707/722
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |

(Continued)

*Primary Examiner* — Robert W Beausoliel, Jr.
*Assistant Examiner* — Pedro J Santos
(74) *Attorney, Agent, or Firm* — Fletcher Yoder PC

(57) ABSTRACT

A server system may include one or more hardware processors that execute computer-readable instructions from a non-transitory memory that cause the processor to receive a time component associated with a query request and one or more relational identification tags associated with a subset of a plurality of data items stored in one or more databases. The processor may then query the one or more databases to identify one or more time series data items based on the time component and the relational identification tags. After querying the databases, the processor may transmit the one or more time series data items to a computing device configured to display the one or more time series data items.

20 Claims, 4 Drawing Sheets

(56) References Cited

U.S. PATENT DOCUMENTS

| | | | | |
|---|---|---|---|---|
| 7,716,353 | B2 | 5/2010 | Golovinsky | |
| 7,769,718 | B2 | 8/2010 | Murley | |
| 7,783,744 | B2 | 8/2010 | Garg | |
| 7,877,783 | B1 | 1/2011 | Cline | |
| 7,890,802 | B2 | 2/2011 | Gerber | |
| 7,925,981 | B2 | 4/2011 | Pourheidari | |
| 7,930,396 | B2 | 4/2011 | Trinon | |
| 7,933,927 | B2 | 4/2011 | Dee | |
| 7,941,506 | B2 | 5/2011 | Bonal | |
| 7,945,860 | B2 | 5/2011 | Vambenepe | |
| 7,966,398 | B2 | 6/2011 | Wiles | |
| 8,051,164 | B2 | 11/2011 | Peuter | |
| 8,082,222 | B2 | 12/2011 | Rangarajan | |
| 8,224,683 | B2 | 7/2012 | Manos | |
| 8,266,096 | B2 | 9/2012 | Navarrete | |
| 8,346,752 | B2 | 1/2013 | Sirota | |
| 8,380,645 | B2 | 2/2013 | Kowalski | |
| 8,402,127 | B2 | 3/2013 | Solin | |
| 8,457,928 | B2 | 6/2013 | Dang | |
| 8,478,569 | B2 | 7/2013 | Scarpelli | |
| 8,554,750 | B2 | 10/2013 | Rangaranjan | |
| 8,612,408 | B2 | 12/2013 | Trinon | |
| 8,646,093 | B2 | 2/2014 | Myers | |
| 8,674,992 | B2 | 3/2014 | Poston | |
| 8,683,032 | B2 | 3/2014 | Spinelli | |
| 8,689,241 | B2 | 4/2014 | Naik | |
| 8,743,121 | B2 | 6/2014 | De Peuter | |
| 8,745,040 | B2 | 6/2014 | Kowalski | |
| 8,812,539 | B2 | 8/2014 | Milousheff | |
| 8,818,994 | B2 | 8/2014 | Kowalski | |
| 8,832,652 | B2 | 9/2014 | Mueller | |
| 8,887,133 | B2 | 11/2014 | Behnia | |
| 8,907,988 | B2 | 12/2014 | Poston | |
| 9,015,188 | B2 | 4/2015 | Behne | |
| 9,037,536 | B2 | 5/2015 | Vos | |
| 9,065,783 | B2 | 6/2015 | Ding | |
| 9,098,322 | B2 | 8/2015 | Apte | |
| 9,122,552 | B2 | 9/2015 | Whitney | |
| 9,137,115 | B2 | 9/2015 | Mayfield | |
| 9,239,857 | B2 | 1/2016 | Trinon | |
| 9,261,372 | B2 | 2/2016 | Cline | |
| 9,323,801 | B2 | 4/2016 | Morozov | |
| 9,348,943 | B2 * | 5/2016 | Bullotta | G06F 16/903 |
| 9,363,252 | B2 | 6/2016 | Mueller | |
| 9,412,084 | B2 | 9/2016 | Kowalski | |
| 9,467,344 | B2 | 10/2016 | Gere | |
| 9,534,903 | B2 | 1/2017 | Cline | |
| 9,535,737 | B2 | 1/2017 | Joy | |
| 9,613,070 | B2 | 4/2017 | Kumar | |
| 9,631,934 | B2 | 4/2017 | Cline | |
| 9,645,833 | B2 | 5/2017 | Mueller | |
| 9,654,473 | B2 | 5/2017 | Miller | |
| 9,659,051 | B2 | 5/2017 | Hutchins | |
| 9,766,935 | B2 | 9/2017 | Kelkar | |
| 9,792,387 | B2 | 10/2017 | George | |
| 9,805,322 | B2 | 10/2017 | Kelkar | |
| 9,819,729 | B2 | 11/2017 | Moon | |
| 9,852,165 | B2 | 12/2017 | Morozov | |
| 9,967,162 | B2 | 5/2018 | Spinelli | |
| 10,002,203 | B2 | 6/2018 | George | |
| 2009/0119330 | A1 | 5/2009 | Sampath et al. | |
| 2009/0248717 | A1 | 10/2009 | Hughes | |
| 2010/0161101 | A1 | 6/2010 | Pouyez et al. | |
| 2011/0099155 | A1 | 4/2011 | Shau et al. | |
| 2016/0357828 | A1 | 12/2016 | Tobin et al. | |
| 2016/0371363 | A1 * | 12/2016 | Muro | G06Q 50/06 |

* cited by examiner

SYSTEMS AND METHODS FOR QUERYING TIME SERIES DATA

CROSS-REFERENCE TO RELATED APPLICATION

This application claims priority to and the benefit of U.S. application Ser. No. 15/483,885, entitled "SYSTEMS AND METHODS FOR QUERYING TIME SERIES DATA", filed Apr. 10, 2017, which is herein incorporated by reference in its entirety.

TECHNICAL FIELD

The present disclosure relates in general to systems, methods, and apparatuses for querying time series data. More specifically, the present disclosure is related to systems and methods for querying a time series database to identify data that has a specified relational aspect and a specified time aspect.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. As systems for collecting data become more readily available and the costs for storage hardware continue to decrease, the amount of data that these computer resources are capable of collecting is increasing. For instance, in addition to collecting raw data more frequently, metadata associated with the time in which the raw data has been generated or acquired may also be stored for a given data set.

Although the capabilities of computer resources for collecting and storing more data continues to expand, the vast amount of collected data may prove to be difficult to interpret and synthesize. That is, to draw inferences from the data that may be useful to the operation of the computer resources, the operation of a business, or the like, it may be useful to analyze only data having certain specified characteristics of interest within the larger set of collected data. Such subsets of data may be more useful to analyze and draw inferences therefrom, thereby increasing the value of the collected data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information at various time intervals. By collecting data at various times, temporal analysis may be performed on the collected data to gain insight into a relationship between certain events that occur at specific times and the properties (e.g., collected data) of monitored components during these events. However, as data is collected over time, it is increasingly difficult to manage or synthesize the collected data to gain any insight into various issues or problems that may be associated with certain devices or components of a given IT network due to the amount of collected data.

With this in mind, an IT system may use multiple databases and database management systems to assist in identifying a relevant subset of data collected over time (e.g., time series data). That is, in one embodiment, the IT system may include a relational database that may store data related to the IT network in an organized manner with respect to a relational model. The IT system may also include a time series database that may store similar data as stored in the relational database at various time intervals. Using the relational database, an application node operating within the IT system may send a query to a relational management system may have access to the relational database. The query may include a request for the relational management system to identify a subset of the data stored in the relational database. The requested subset of data may be related to each other based on certain relational aspects that may be defined by the query request. In some embodiments, the relational database management system may identify the subset of data from the relational database based on these relational aspects. The relational database management system may also determine relational identification tags associated with the identified subset of data, such that the relational identification tags may be used to identify the same subset of data in various other databases, such as the time series database.

After obtaining the relational identification tags, the application node may send a time series query to a time series database management system that may have access to the time series database. The time series query provided to the time series database management system may include the relational identification tags, as provided by the relational database management system, and a time component that defines a range of time values. The time series database management system may then retrieve the subset of data from the time series database that corresponds the relational identification tags and the specified time range. The identified time series data may then be provided to the application node for view, analysis, and the like.

By using a separate query for the relational database and the time series database, the application node may query time series data after data has been collected by the time series database. That is, the application node may query time series data after the time series data has been collected, as opposed to providing the time series query request details (e.g., relational component, time component) prior to the collection of data by the time series database.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

Figure 1:
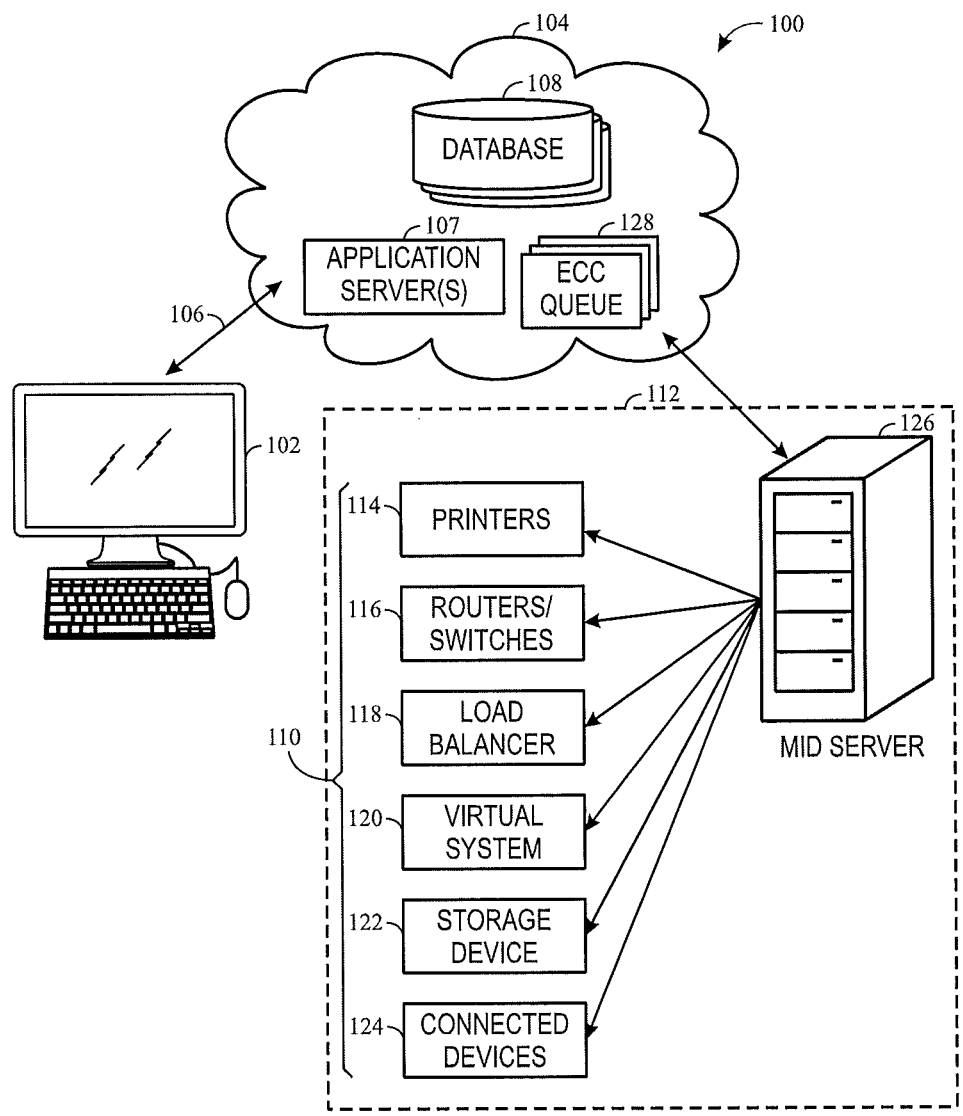
FIG. 1 is a block diagram of a generalized distributed computing system utilizing a cloud service and a configuration management databases (CMDB), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an increasingly electronics-driven world in which various electronics devices are interconnected within a distributed context. As more functions are performed by services using some form of distributed computing, the complexity of IT network management increases. As these devices are separated geospatially, managing and tracking configuration of these devices may become more difficult.

In such an interconnected but distributed context, the configuration of each of these devices may be represented by configuration items (CIs) that detail certain configurations, parameters, components, software, or settings associated with a respective device. As will be discussed in greater detail below, CIs may include information related to a physical entity (e.g., hardware), a logical entity (e.g., version, instance of a database), a conceptual entity (e.g., service), and the like associated with a respective device. Given the wide variety of CIs associated with various devices within this type of complex IT environment, configuration item (CI) discovery executed on a given infrastructure is used to track the CIs of the devices that are present on the connected IT environment. That is, CI discovery is the process of finding configuration items, such as hardware, software, documentation, location, and other information related to the devices connected to a given network, such as an enterprise's network. This discovery process may be performed at least partially using automated routines, e.g., an application program, running on the network in question. When a CI is found by such routines, discovery includes exploring some or all of the CI's configuration, provisioning, and current status. This explored information is used to update one or more databases, such as a configuration management database (CMDB), accordingly.

The CMDB stores and tracks the discovered CIs connected to the network. Such information stored on the CMDB may then be used by other applications and/or by IT personnel in managing or using the resources on the network. On computer systems, the discovery process may identify CIs such as software applications running on discovered devices, and any connections, such as Transmission Control Protocol (TCP) connections between discovered devices. Discovery may also be used to track the relationships between computer systems, such as an application program running on one server that utilizes a database stored on another server. CI discovery may be performed at initial installation or instantiation of connections or new devices, and/or CI discovery may be scheduled to occur periodically to track additions, removals, or changes to the IT devices being managed, thereby keeping data stored on the CMDB. Thus, using the discovery process, an up-to-date map of devices and their infrastructural relationships may be maintained.

In addition to the discovery process, IT networks may include server systems that acquire and store data related to a number of measurable properties. For example, for a given computer system, data regarding performance of computer resources (e.g., central processing unit, disk, memory transaction count), instance cache size, code performance data (e.g., business rules count, cache size), large record counts (e.g., open incidents, tests), and the like may be stored at various times in a database (e.g., time series database) accessible to a server system. As the amount of stored data increase, along with date/time stamps regarding when the data was acquired, it becomes increasingly difficult to filter through the stored data to identify subsets of the data that may be relevant to a particular issue or problem.

With this in mind, in one embodiment, an application server may receive a relational time series query request that is directed to identifying and/or analyzing certain specified relational data based at least in part on date and time characteristics. Thus, the relational time series query request may include a relational component that filters a collection of data according to one or more relational properties and a time component that filters the collection of data according to certain time properties. Using the relational component, the application server may query a relational database server (e.g., a MySQL server) to identify a subset of data stored in a relational database that corresponds to the relational component. The relational database may store the collected data according to a relational model (e.g., interconnected or linked tables) that characterizes data according to various properties.

After receiving the relational identification tag, the application server may query a time series database server using the relational identification tag and the time component to identify a subset of time series data that corresponds to the original relational time series query request. As such, the time series database server may identify a first subset of time series data stored in a time series database that corresponds to the relational identification tag or the desired relational properties of the relational component. The time series database server may then filter through the first subset of time series data to identify a second subset of time series data that has the properties of the time component specified in the original relational time series query request. The time series database server then sends the second subset of time series data to the application server.

By leveraging the relational database server and the time series database server, the application server may query time series data. That is, instead of indicating to the time series database server the parameters related to a relational time series data query prior to the collection of data, the application server may instead analyze and sort through time series data that may be related to a specific incident of event that happened in the past. Thus, instead of querying the time series data based upon a specified date or time, the user may instead query the time series data based upon an incident or event (e.g., a hardware failure, connectivity issue, and so forth) identified or stored in a relational database context. As such, the application server is more capable of filtering time series data based on events or incidents of interest to allow for more useful synthesis and analysis in understanding causes for certain issues or problems that may be related to the time series data. Additional details regarding querying a time series database based on a relational times series query request will be provided below with reference to FIGS. 1-7.

By way of introduction FIG. 1 is a block diagram of a system 100 that utilizes a distributed computing framework, which may perform one or more of the techniques described herein. As illustrated in FIG. 1, a client 102 communicates with a cloud service 104 over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The cloud service 104 may include any suitable number of computing devices (e.g., computers) in one or more locations that are connected together using one or more networks. For instance, the cloud service 104 may include various computers acting as servers in datacenters at one or more geographic locations where the computers communicate using network and/or Internet connections. The communication channel 106 may include any suitable communication mechanism for electronic communication between the client 102 and the cloud service 104. The communication channel 106 may incorporate local area networks (LANs), wide area networks (WANs), virtual private networks (VPNs), cellular networks (e.g., long term evolution networks), and/or other network types for transferring data between the client 102 and the cloud service 104. For example, the communication channel 106 may include an Internet connection when the client 102 is not on a local network common with the cloud service 104. Additionally or alternatively, the communication channel 106 may include network connection sections when the client and the cloud service 104 are on different networks or entirely using network connections when the client 102 and the cloud service 104 share a common network. Although only a single client 102 is shown connected to the cloud service 104, it should be noted that cloud service 104 may connect to multiple clients (e.g., tens, hundreds, or thousands of clients).

Through the cloud service 104, the client 102 may connect to various devices with various functionality, such as gateways, routers, load balancers, databases, application servers running application programs on one or more nodes, or other devices that may be accessed via the cloud service 104. For example, the client 102 may connect to an application server 107 and/or one or more databases 108 via the cloud service 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the cloud service 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and business services controlled by a client 102 and the configurations of these assets and services. The assets and services include configuration items (CIs) 110 that may be computers, other devices on a network 112 (or group of networks), software contracts and/or licenses, or business services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a confirmation management database (CMDB) that may store the data concerning CIs 110 mentioned above along with data related various IT assets that may be present within the network 112. In addition to the databases 108, the cloud service 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. By way of example, the additional databases may include a relational database and a time series database, which will be discussed in greater detail below. The additional databases may be implemented and/or managed using any suitable implementations, such as a relational database management system (RDBMS), a time series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the cloud service 104 may have access to one or more databases external to the cloud service 104 entirely.

In the depicted topology, access to the CIs 110 from the cloud service 104 is enabled via a management, instrumentation, and discovery (MID) server 126 via an External Communications Channel (ECC) Queue 128. The MID server 126 may include an application program (e.g., Java application) that runs as a service (e.g., Windows service or UNIX daemon) that facilitates communication and movement of data between the cloud service 104 and external applications, data sources, and/or services. The MID service 126 may be executed using a computing device (e.g., server or computer) on the network 112 that communicates with the cloud service 104. As discussed below, the MID server 126 may periodically or intermittently use discovery probes to determine information on devices connected to the network 112 and return the probe results back to the cloud service 104. In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the cloud service 104 that communicates with a border gateway device of the network 112.

The ECC queue 128 may be a database table that is typically queried, updated, and inserted into by other systems. Each record in the ECC queue 128 is a message from an instance in the cloud service 104 to a system (e.g., MID server 126) external to the cloud service 104 that connects to the cloud service 104 or a specific instance running in the cloud service 104 or a message to the instance from the external system. The fields of an ECC queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message. The agent field identifies a name (e.g., mid.server.xxxx) of the external system that the message is directed to or originates from. The topic field is a value (e.g., arbitrary values) that indicates that a message pertains to a particular subject. For example, during discovery of CIs 110, the topic field may be populated with a value to identify a name of the probe that has been/is going to be run. The name field provides more detail in a context indicated by the topic field. For example, in discovery, the name field may be a descriptive and human-readable name or a command to be run by the probe identified in the topic field. Alternatively, if the topic field contains "SSHCommand", the name field may indicate the shell command to be run.

The source field indicates a target or recipient of the message outside of the cloud service 104. In discovery, the source field may contain an Internet Protocol (IP) address that the discovery probe is to be/has been run against, or the field may include a human-readable description when the probe is to be/has been run against multiple IP addresses.

The response to field, when included, contains a reference (e.g., sys_id) to the ECC queue 128 that the message is a response to. In discovery, a discovery result may be a response to a discovery schedule message.

The queue field indicates whether the message is incoming to the cloud service 104 or outgoing from the cloud service 104. The state field indicates whether the message is ready to be processed, is being processed, or has been processed. The recipient of the message generally updates this field. The time created field indicates when the record was first stored in the ECC queue 128. The time processed field indicates when the record was updated to processed.

In some embodiments, the messages are sequenced using a sequencing field that includes a number assigned at generation of the record. The error string field, when included, indicates that an error occurred and/or a type of error that occurred.

The payload field is the body of the message. The contents of this field are specific to the context of the record and the system that is exchanging information with the cloud service 104. For example, a result of a discovery probe uses Extensible Markup Language (XML) documents for the payload. For instance, in some embodiments, the returned XML document may have a root tag of  containing one or more <result> tags and a single <parameters> tag. The parameters are simply an echo of those sent to the MID server 126 in the probe.

Although the system 100 is described as having the application servers 107, the databases 108, the ECC queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the cloud service 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the cloud service 104.

In addition, other methods for populating the databases 108 may include directly importing the CIs or other entries from an external source, manual import by users entering CIs o or other entries via a user interface, and the like. Moreover, although the details discussed above are provided with reference to the CMDB, it should be understood that the embodiments described herein should not be limited to being performed with the CMDB. Instead, the present systems and techniques described herein may be implemented with any suitable database.

Figure 2:
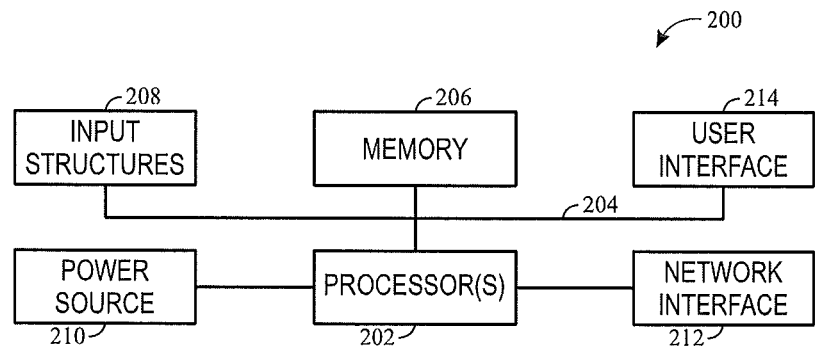
FIG. 2 is a block diagram of a computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the cloud service 104 (e.g., server hosting the ECC queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Figure 3:
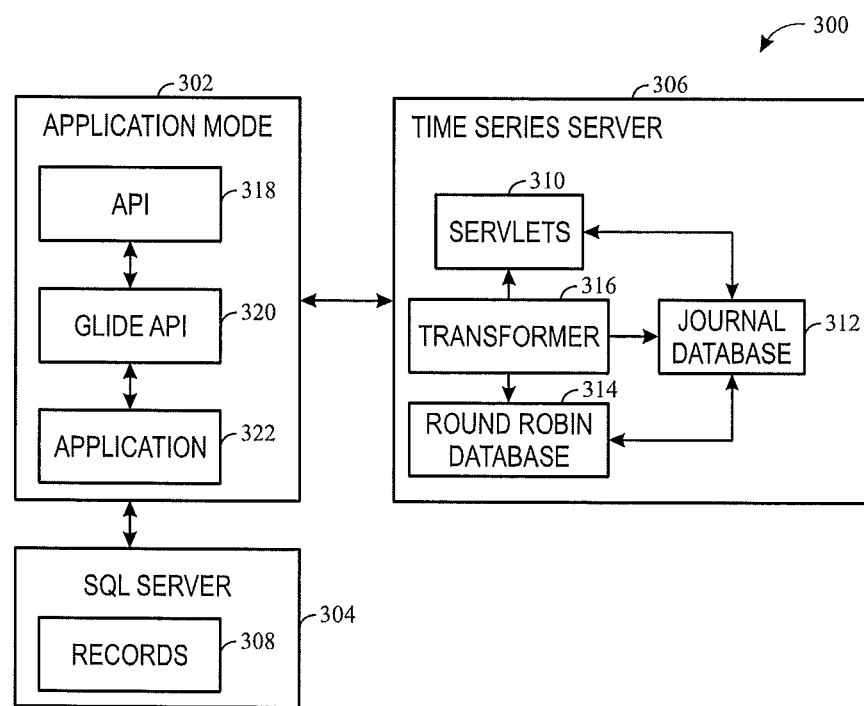
FIG. 3 is a block diagram of an example server system that may be part of the distributed computing system of FIG. 1, in accordance with an embodiment.

With the foregoing in mind, FIG. 3 illustrates a block diagram of an example server system 300 that may be employed to facilitate relational time series query requests. Generally, time series data may include data acquired at various times and stored in a database (e.g., a time series database). Since the time series data is acquired multiple times, the amount of raw data that makes up the time series data can be difficult to sort through and analyze due to its size. However, time series data can provide valuable insight with regard to trends and/or correlations related to certain events. For instance, performance properties (e.g., CPU usage, memory usage) of a computer system may be tracked and stored as time series data, allowing such performance properties to be analyzed over time, over a limited window of time, or in view of various periodic or time based conditions (e.g., CPU usage every third Friday or on the 15th of each month) that may be otherwise difficult to perceive.

While the time series data is being acquired, the computer system being monitored may experience some type of event, such as unexpectedly entering a suspended or sleep state. When performing analysis to determine what may have contributed to or caused the event, it may be useful to identify data corresponding to the timing of the event, potentially including data acquired within a window of time that includes the event as well as data acquired prior to and subsequent to the event. By way of example, the time series data regarding the performance properties of the computer system before the event occurred may be useful to determine whether any correlation exists between the performance properties and the event. With this in mind, in certain embodiments, the server system 300 of FIG. 3 may be employed to query time series data based on certain relational aspects of the data (e.g., entries in an error log, a maintenance log, an update log, and so forth stored in a relational database) and certain time aspects of the data. As such, the server system 300 may enable users to organize and identify time series data based on variable relational and time components without being pre-programmed to tag the data related to a query before the data is received.

Referring now to FIG. 3, the server system 300 may include an application node 302, a structured query language (SQL) server 304, and a time series server 306. The application node 302 may include an application or program executed on the client 102, the application server 107, or any suitable computing device. The SQL server 304 may be a suitable relational database management system that is based on a relational model. The relational model may be related to a relational database that collects data items as a set of tables that can be accessed or reassembled in a variety of manners. The SQL server 304 may use an application program interface, such as structured query language, to facilitate interactive queries for information or datasets from the relational database. In one embodiment, the SQL server 304 may be a MySQL server that is an open-source relational database management system; however, it should be noted that the SQL server 304 may be any suitable relational database management system.

The SQL server 304 may include records 308 that may be stored in a database. The records 308 may include data collected by sensors, received via the system 100, or the like. The records 308 may be organized in tables according to a relational database that may be queried using SQL or a comparable query interface. The records 304 may include data regarding the CIs 110 mentioned above. For instance, the records 304 may include relational data regarding the printers 114, the routers/switches 116, the load balancers 118, the virtual systems 120, the storage devices 122, and/or other connected devices 124 with respect to various properties (e.g., location, performance data, size, load, usage, errors, updates, firmware versions, and so forth) related to the same. The records 304 may organize the data in accordance with the relational model via a tabular format.

Referring now to the time series server 306, the time series server 306 may be a server system, implemented via a computing device 200 or the like, that may have access to time series data. As such, in some instances, the time series server 306 may be referred to as a time series database management system, or a time series server system. The time series server 306 may include one or more servlets 310, a journal database 312, a round robin database 314, and a transformer component 316. The servlets 310 may include a resident program or set of computer-executable instructions that are executed by the time series server 306. In one embodiment, the servlets 310 may facilitate time series query requests and retrieve results for the queries from the journal database 312, the round robin database 314, and the like.

The journal database 312 and the round robin database 314 may be a time series database that stores time series data. As mentioned above, the time series data may include properties regarding the CIs 110, such as network bandwidth, temperature, CPU load, and so forth, acquired at periodic or arbitrary intervals. The journal database 312 and the round robin database 314 may be circular buffer based databases that collect data at different times. The round robin database 314 may store data in a round-robin archive, in multiple round-robin archives, or the like. Generally, the journal database 312 and the round robin database 314 may continuously collect data (e.g., time series data) along with date/time stamps recording the date and time in which each data item was received. After the time series data has been collected, the time series server 306 may employ the servlets 310 to query the journal database 312 and the round robin database 314 to retrieve a subset of the time series data related to the query. In one embodiment, the journal database 312 may receive data being collected, and the round robin database 314 may periodically (e.g., daily, weekly, monthly, semi-annually) compact the data written into the journal database 312. However, it should again be noted that the journal database 312 and the round robin database 314 are provided herein as examples and any suitable database may be employed herein. Additional details with regard to how the time series server 306 may retrieve the time series data query results will be discussed below with reference to FIGS. 4-6.

The time series data may be a series type that is characterized as a "FLOAT_SIGNAL," which may be a series of {instant, value} with a discrete fixed time period, continuous dense values (e.g., each value is stored, missing intermediate values are interpolated), and numeric values stored as floats (e.g., 32-bit float representation). As such, the time series data may measure performance properties (e.g., transaction count, transaction time, duration, counts) of components such as the CPU, memory, or the like. In addition, the time series data may include data related to non-numeric values (e.g., string, bit fields, choices), numeric types other than floats (e.g., double, integer, decimal), non-periodic or sparse data (e.g., events), sub-second resolutions, multi-dimensional types (e.g., coordinates), and the like.

In some embodiments, the time series server 306 may be instructed to collect data (e.g., metrics) having a particular name, types, retention schedule (e.g., 8 days at 1 minute intervals, 30 days at 10 minute intervals, 1 year at 1 hour intervals), and the like. As such, the time series server 306 may receive a dimension that details a name, type, and retention schedule for monitored properties, a time range including a start and end date, and the like. After receiving the instructions, the time series server 306 may access the appropriate database(s), sensors, or the like to gather the time series data in accordance with the instructions. In one embodiment, the time series server 306 may maintain or store the collected data in an appropriate database.

In addition to the components described above, the time series server 306 may include a transformer component 316. The transformer component 316 may be a processor-based component that performs certain analytical operations (e.g., math, average, threshold comparisons) for the time series data. For instance, the transformer component 316 may retrieve a subset of the time series data (e.g., temperature of CPUs over a time period) based on a time series query, determine an average value for the retrieved results (e.g., average temperatures of CPUs over the time period), and identify items (e.g., CPUs) that have average values that exceed a threshold. Additional details regarding the operation of the transformer component 316 will be discussed below with reference to FIGS. 4-6.

Although the time series server 306 has been described as having access to the journal database 312 and the round robin database 314, it should be noted that the time series server 306 may access any suitable database in which time-series data is stored. In the same manner, in some embodiments, the time series server 306 may not use the servlets 310 to access the connected databases, and may instead use processors that operation the time series server 306 to access the connected databases.

Referring back to the application node 302, the application node 302 may include an application programming interface (API) 318, a glide API 320, and an application 322 stored in a memory or computer-readable medium. The API 318 may include a set of definitions, protocols, and/or tools to facilitate communication between the time series server 306 and the application node 302. In one embodiment, the API 318 may communicate with the time series server 306 via Hypertext Transfer Protocol (HTTP) or other suitable protocols. The glide API 320 may also include a set of definitions, protocols, and/or tools to facilitate communication between the glide API 320 and the application 322. The glide API 320 may corresponds to the GlideSystem by ServiceNow®, but it should be noted that any suitable API may be employed. In the same manner, the API 318 may be substituted for another suitable API that may interface with the time series server 306 or other suitable time series database management server system.

The application 322 may include a program or set of instructions executable by the application node 302 to receive a relational time series query request from a user via the computing device 200. As such, the application 322 may include components that enable the application 322 to interact with the SQL server 304 and the time series server 306. In certain embodiments, the relational time series query request may include a relational component and a time component. The relational component may correspond to a relational query having certain properties. For instance, the relational query may request to identify server systems that are used by a particular business department (e.g., information technology). The results of the relational query may thus include a table or record that includes a set of data listing the server systems that are part of the specified business department.

The time component of the time series query request may include a time range. The time range may include a period of time when data has been acquired or received. An example time component may include the load of the server systems that are part of the specified business mentioned in the example above during the last 10 days.

In some embodiments, the time component may include an analysis operation that may cause the transformer component 316 to perform analysis (e.g., sum, average, standard deviation) on the results of a time series query request. Continuing the example described above, the analysis operation may request that the load value of the server systems that are part of the specified business for the last 10 days are averaged for each server system. The transformer component 316 may also be provided analysis operations that include identifying the server systems that have an average load value that is above some threshold.

Figure 4:
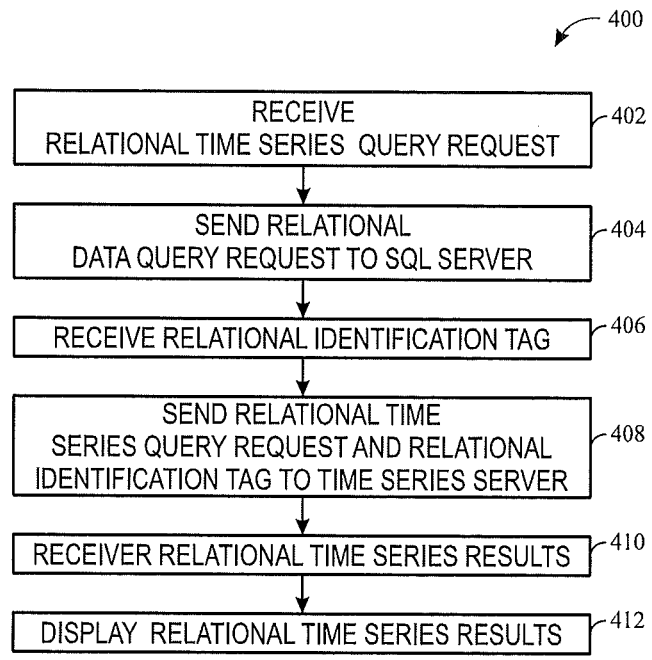
FIG. 4 is a flow chart of a method for retrieving data related to a relational time series request using the example server system of FIG. 3, in accordance with an embodiment.

With the foregoing in mind, FIG. 4 illustrates a flow chart of a method 400 for retrieving relational time series query request results. Although the method 400 will be described as being performed by the application node 302, it should be noted that any suitable computing device 200 may perform the method 400. Moreover, although the steps of method 400 are described as being performed in a particular order, it should be understood that the steps of the method 400 may be performed in any suitable order or certain steps may be performed in parallel.

By way of example, the method 400 corresponds to a process that the application node 302 may undertake when retrieving data that corresponds to a relational time series query request. As such, a user may provide the query request via the application node 302. The application node 302 may then query the SQL server 304 to identify a set of data that corresponds to the relational component of the relational time series query request. The SQL server 304 may identify the set of data that corresponds to the relational component and provide a system (e.g., sys) identification (ID) number for each data item of the set of data. The system ID number may be a unique value that the SQL server 304 may assign to each data item. As such, the SQL server 304 may return the system ID numbers of the identified data items to the application node 302. The application node 302 may then query the time series server 306 using the time component of the relational time series query request and the system ID numbers provided by the SQL server 304. The time series server 306 may retrieve the relevant time series data that fit the time component and the system ID numbers and provide the results to the application node 302. By leveraging the system ID numbers generated by the SQL server 304 with the query request provided to the time series server 306, the application node 302 may retrieve relational time series data query requests at various time without relying on the time series server 306 to be pre-programmed to collect the relevant data.

Referring now to FIG. 4, at block 402, the application node 302 may receive a relational time series query request from a user via the application 322 or the like. As mentioned above, the relational time series query request may include a relational component and a time component. The relational component may detail one or more properties (e.g., location, name, department, type) regarding data items stored in a database or the like. The time component may specify a time range or duration in which the data items were originally collected, generated, or the like.

An example relational time series query request may include identifying the server systems that support the information technology (IT) department of an organization, that had system temperatures greater than 100 degrees Fahrenheit (F), when an update to one of the server systems stalled. For illustrative purposes, this example may be referred to within the context of various parts of the method 400.

At block 404, the application node 302 may send a relational data query request to the SQL server 304. The relational data query request may include the relational component of the time series data query request received at block 402. With the preceding example in mind, the relational data query request may include identifying the server systems that support the IT department. That is, the relational data query request may identify data items that fit properties (e.g., server systems within the IT department) detailed by the request.

Figure 5:
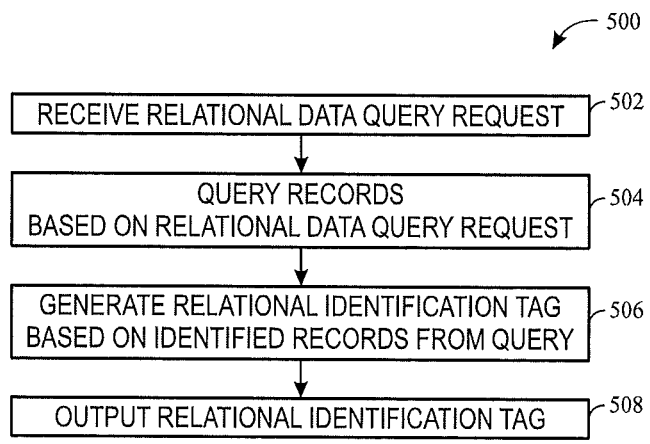
FIG. 5 is a flow chart of a method for retrieving a relational identification tag associated with a relational time series request using the example server system of FIG. 3, in accordance with an embodiment.

After the application node 302 sends the relational data query request to the SQL server 304, the SQL server 304 may query accessible databases or the records 308 to identify the query results. FIG. 5 illustrates a flow chart of a method 500 for retrieving relational identification tags based on the relational data query request. Although the method 500 is described as being performed by the SQL server 304, it should be noted that the method 500 may be performed by any suitable server system that receives the relational data query request. Moreover, the steps of the method 500 should not be limited to being performed in the order presented; instead, the steps of the method 500 may be performed a variety of suitable orders or in parallel where appropriate.

Referring to FIG. 5, at block 502, the SQL server 304 may receive the relational data query request from the application node 302. At block 504, the SQL server 304 may query the records 308 based on the relational data query request or the relational component of the time series data query request mentioned above.

When querying the records 308, the SQL server 304 may sort through tables to identify data items that fit the relational criteria provided in the request. In some embodiments, the SQL server 304 may generate a new record or table with the data items that fit the query.

After identifying the data items that correspond to the query request, at block 506, the SQL server 304 may generate a relational identification (ID) tag (e.g., system ID number) for each identified data item. In some embodiments, the relational ID tag may be predefined or preassigned to each data item. In any case, the relational ID tag may be used to identify data items in various databases. For instance, the relational ID tag may correspond to data items stored in a time series database or other databases that may be accessible by various server systems within the system 300 or the like.

At block 508, the SQL server 304 may send the relational ID tags associated with the identified data items that correspond to the relational data query request to the application node 302. The application node 302 may then use the relational ID tags to query the time series server 306.

Referring back to FIG. 4, at block 406, the application node 302 may receive the relational ID tag, as discussed above. At block 408, the application node 302 may send the relational time series query request and the relational ID tag to the time series server 306. In some embodiments, the application node 302 may send the time component of the relational time series query request along with the relational ID tag to the time series server 306, such that the time series server 306 may query the accessible databases to identify the relational time series query request results.

Figure 6:
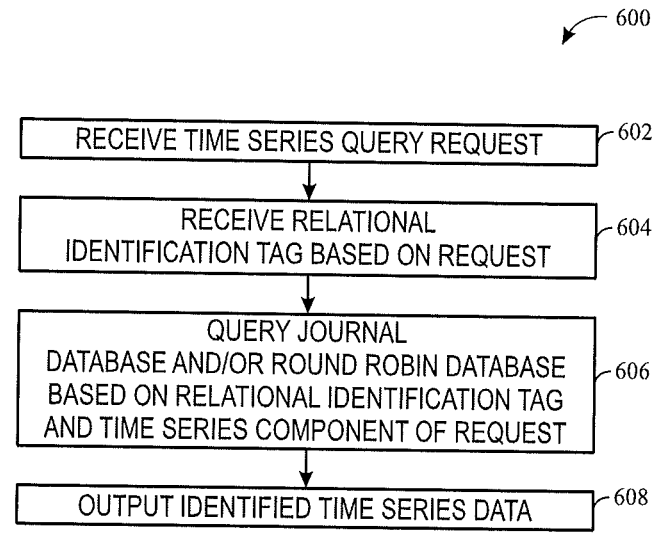
FIG. 6 is a flow chart of a method for retrieving time series query results associated with a relational time series request using the example server system of FIG. 3, in accordance with an embodiment.

FIG. 6 illustrates a flow chart of a method 600 for identifying time series data that corresponds to a relational time series query request, in accordance with the methods 400 and 500 described above. As discussed above with regard to methods 400 and 500, the steps of the method 600 may be performed in any suitable order and by any suitable type of computing device 20.

Referring now to FIG. 6, at block 602, the time series server 306 may receive the time series query request. As such, the time series server 306 may receive the time component of the relational time series query request discussed above. At block 604, the time series server 306 may receive the relational ID tags associated with the relational time series request discussed with reference to FIG. 5. Continuing the example discussed above, the time component for the server systems in the IT department is related to when an update to a particular server system stalled. The time component may be specified by a user within the request as a period of time (e.g., weeks, days) prior to the stall event. Moreover, the relational time series query request may also include a request for time series data items associated with each relational ID tag. Continuing again with the above example, the time series data items may include temperature values of the server systems in the IT department for the defined time period.

After receiving the time component of the relational time series query request and the relational ID tags, at block 606, the time series server 306 may query the journal database 312 and/or the round robin database 314 using the relational ID tag and the time component. In one embodiment, the time series server 306 may use the relational ID tags to identify a set of data that includes data items that correspond to each tag. As discussed above, the relational ID tag may be associated with a particular data item having certain relational properties, as detailed by the relational component described above.

After identifying the relevant data items in the journal database 312 and/or the round robin database 314, the time series server 306 may identify or filter the data items that correspond to the relational ID tags based on the time component. That is, the identified data items may include a number of entries for each respective data item. Each entry may correspond to a different time in which the data item was acquired. As mentioned above, the time component may specify a range of time that corresponds to the desired times of the original query. In certain embodiments, the time series server 306 may employ the servlets 310 to query the accessible databases.

In any case, at block 608, after identifying the data items that correspond to the relational ID tags and the time component, the time series server 306 may output or send the identified time series data to the application node 302. Referring back to FIG. 4, the application node 302 may, in turn, receive the time series data at block 410 from the time series server 306.

At block 410, the application node 302 may display the time series results via a display device of the computing device 200 or the like. The time series results may be organized with respect to each relational ID tag and the time range of the time component in a table or like In some embodiments, the relational time series query request discussed above with respect to block 402 may also include an analysis component that may indicate a type of statistical analysis to be performed on the time series data. The statistical analysis may include calculating a sum, product, average, standard deviation, and the like. The statistical analysis may also include filtering operations, such as identifying data items that are above or below a threshold. The application node 302 may send the analysis component to the time series server 306 along with the time series query request and the relational ID tags. The time series server 306 may, in turn, perform the analysis that corresponds to the analysis component after the relevant data items are identified or may send instructions to the component 316 to perform the analysis.

Referring again to the example discussed above, the analysis component may request that an average temperature for each server system over the time period specified by the time component be determined for the server systems of the IT department. As such, the component 316 or the like may perform the requested analysis and return the results to the application node 302 as discussed above.

The retrieved time series data results and/or the analyzed time series data may be useful in identifying anomalies within the data that may provide insight into a cause or an aspect related to some event (e.g., update stall). The anomalies may include change in data entry values over the time period, erratic data entry values, or the like. In some embodiments, the application node 302 may correlate the identified anomalies with known events that may be undesirable, such as shut downs. The application node 302 may then establish alerts and monitor the time series data and perform some preventive measures (e.g., taking servers offline) when certain anomalies are detected.

Figure 7:
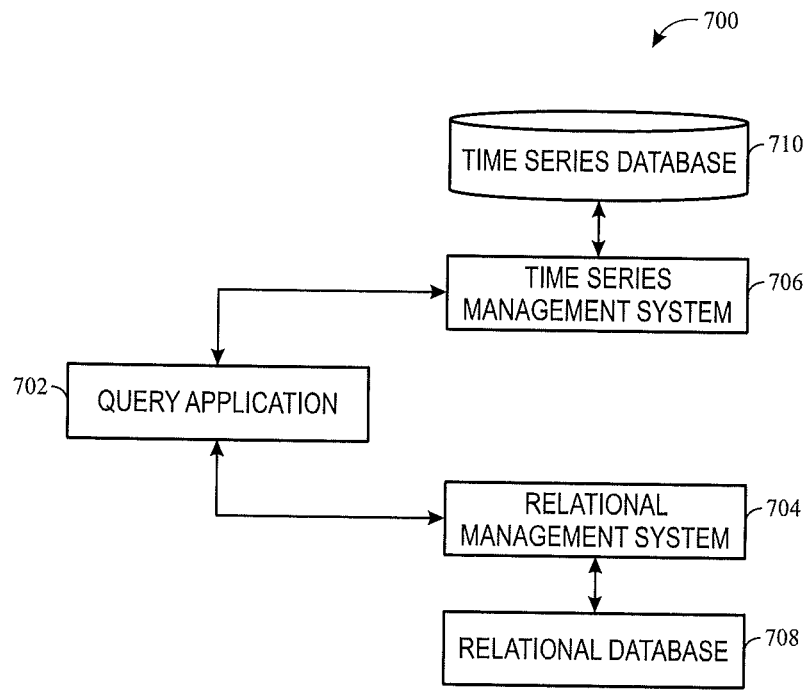
FIG. 7 is a block diagram of an example server system that may be employed to perform the methods of FIGS. 4-6.

It should be noted that the server system 300 of FIG. 3 illustrates an example embodiment in which the systems and techniques described herein may be performed. FIG. 7 illustrates another system 700 of components that may also implement the systems and techniques described herein. That is, the system 700 may include a query application 702 that may correspond to any suitable application that may be executed by the application node 302, the application servers 107, the computing device 200, or the like.

The query application 702 may communicate with a relational management system 704 and a time series management system 706. The relational management system 704 may be a server system that facilitates query requests on relational databases. As such, the relational management system 704 may be communicatively coupled to a relational database 708. Using the relational database 708, the relational management system 704 may generate tables or retrieve query results associated with a relational query request. In some embodiments, the relational management system 704 may retrieve relational identification tags for each data item identified in response to the relational data query.

The time series management system 706 may also be a suitable server system that may be communicatively coupled to a time series database 710. The time series database 710 may include similar data as provided in the relational database 708 but with a plurality of entries for each data item. That is, each entry for a particular data item may correspond to a time in which the data entry was acquired or received. Alternatively, each entry may be associated with a time for the data item.

The time series management system 706 may query the time series database 710 to retrieve time series data that correspond to a time series query request. As such, the time series management system 706 may receive relational ID tags, as determined by the relational management system, via the query application 702 to identify a subset of data from the time series database 710. The time series management system 706 may then filter through the subset of data based on a time component of the time series query request to identify the time series data results. The time series management system 706 may the forward the time series data results to the query application 702 for display, analysis, reporting, and the like.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory computer-readable medium, comprising computer-executable instructions that, when executed by one or more processors, cause the one or more processors to:
    receive a time component and a relational component associated with a query request;
    query a first round robin database based on the relational component to identify a plurality of data items stored in the first round robin database;
    retrieve one or more relational identification tags that identify each data item of the plurality of data items;
    query a second round robin database to identify one or more time series data items based on the time component and the one or more relational identification tags;
    send the one or more time series data items to a computing device configured to apply one or more mathematical operations to the one or more time series data items according to an analysis component of the query request, thereby generating one or more results of the one or more mathematical operations applied to the one or more time series data items;
    detect one or more anomalies within the one or more results received from the computing device; and
    provide a notification indicative of the one or more anomalies.

2. The non-transitory computer-readable medium of claim 1, wherein the time component comprises a time interval.

3. The non-transitory computer-readable medium of claim 1, wherein the relational component comprises a location, a name, a department, a type of data, or any combination thereof related to one or more data items of the plurality of data items.

4. The non-transitory computer-readable medium of claim 1, wherein the one or more mathematical operations comprises a sum operation, a product operation, a threshold comparison operation, or any combination thereof.

5. The non-transitory computer-readable medium of claim 1, wherein the first round robin database comprises a plurality of tables or records organized according to a relational model.

6. The non-transitory computer-readable medium of claim 1, wherein the first round robin database comprises a relational database, and wherein the second round robin database comprises a time series database.

7. A system, comprising:
    a processor configured to:
        execute an application, wherein the application, when executed by the processor, is configured to receive a time component and a relational component associated with a query request;
    a first Structured Query Language (SQL) server configured to:
        receive a query from the processor, wherein the query is based on the relational component;
        identify a plurality of data items stored in a first round robin database; and
        retrieve one or more relational identification tags that identify each data item of the plurality of data items; and
    a second Structured Query Language (SQL) server configured to:
        receive one or more instructions to query a second round robin database, wherein the one or more instructions include the one or more relational identification tags received via the first SQL server;

identify one or more time series data items based on the time component and the one or more relational identification tags, wherein each of the one or more time series data items is identified using the one or more relational identification tags, wherein the processor is configured to:

receive the one or more time series data items from the second SQL server;

apply one or more statistical analyses to the one or more time series data items via an analysis component of the query request, thereby generating one or more results of the one or more statistical analyses;

detect one or more anomalies with respect to the one or more results; and provide a notification indicative of the one or more anomalies.

8. The system of claim 7, wherein the one or more statistical analyses comprises calculating a sum, a product, an average, a standard deviation, or any combination thereof of the one or more time series data items.

9. The system of claim 7, wherein the first SQL server and the second SQL server corresponds to a MySQL server.

10. The system of claim 7, wherein the processor is configured to execute an application programming interface (API) configured to communicate with the first SQL server, the second SQL server, or both.

11. The system of claim 10, wherein the API is configured to communicate with the first SQL server, the second SQL server, or both via Hypertext Transfer Protocol (HTTP).

12. The system of claim 10, wherein the processor is configured to execute a Glide application programming interface (API) configured to communicate with the API.

13. The system of claim 7, wherein the first round robin database comprises a relational database, and wherein the second round robin database comprises a time series database.

14. The system of claim 7, wherein the time component comprises a time interval.

15. The system of claim 7, wherein the relational component comprises a location, a name, a department, a type of data, or any combination thereof related to the plurality of data items.

16. A method, comprising:

receiving, via one or more processors, a time component and a relational component associated with a query request;

querying, via the one or more processors, a first journal database based on the relational component to identify a plurality of data items stored in the first journal database;

retrieving, via the one or more processors, one or more relational identification tags that identify each data item of the plurality of data items;

querying, via the one or more processors, a second journal database to identify one or more time series data items based on the time component and the one or more relational identification tags;

sending, via the one or more processors, the one or more time series data items to a computing device configured to apply one or more mathematical operations to the one or more time series data items according to an analysis component of the query request, thereby generating one or more results of the one or more mathematical operations applied to the one or more time series data items;

detecting, via the one or more processors, one or more anomalies within the one or more results received from the computing device; and providing, via the one or more processors, a notification indicative of the one or more anomalies.

17. The method of claim 16, comprising displaying, via the one or more processors, the one or more time series data items via an electronic display.

18. The method of claim 16, wherein the first journal database comprises a relational database, and wherein the second journal database comprises a time series database.

19. The method of claim 18, wherein the time series database comprises a plurality of data entries, wherein each data entry of the plurality of data entries is associated with a time value, and wherein at least a portion of the plurality of data entries is acquired at a plurality of times.

20. The method of claim 16, wherein the one or more mathematical operations comprises a sum operation, a product operation, a threshold comparison operation, an average operation, a standard deviation operation, or any combination thereof.

* * * * *